United States Patent
Shima

(10) Patent No.: US 7,460,946 B2
(45) Date of Patent: Dec. 2, 2008

(54) PRECEDING VEHICLE FOLLOWING CRUISE CONTROL SYSTEM

(75) Inventor: Takashi Shima, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 738 days.

(21) Appl. No.: 11/178,439

(22) Filed: Jul. 12, 2005

(65) Prior Publication Data
US 2006/0015241 A1 Jan. 19, 2006

(30) Foreign Application Priority Data
Jul. 16, 2004 (JP) .............................. 2004-209971

(51) Int. Cl.
*G05D 1/00* (2006.01)
*B60T 7/12* (2006.01)

(52) U.S. Cl. .......................... 701/96; 701/93; 701/300; 340/901; 340/903; 318/54; 342/70

(58) Field of Classification Search ................... 701/93, 701/96, 95, 300; 340/901, 903; 318/54; 342/72
See application file for complete search history.

(56) References Cited

U.S. PATENT DOCUMENTS

| 4,700,563 | A | * | 10/1987 | Iwata et al. ............... 73/115.02 |
| 4,934,476 | A | * | 6/1990 | Hyodo ........................ 180/176 |
| 5,125,471 | A | * | 6/1992 | Iwaoka et al. ............... 180/179 |
| 5,230,400 | A | * | 7/1993 | Kakinami et al. ........... 180/169 |
| 5,485,892 | A | * | 1/1996 | Fujita ......................... 180/167 |
| 6,178,372 | B1 | * | 1/2001 | Tabata et al. ................ 701/97 |
| 6,282,484 | B1 | * | 8/2001 | Enomoto et al. ............ 701/97 |
| 6,304,810 | B1 | * | 10/2001 | Westerberg ................ 701/93 |
| 6,342,832 | B1 | * | 1/2002 | Fuchs et al. ................. 340/436 |

(Continued)

FOREIGN PATENT DOCUMENTS

DE 10254582 A1 6/2004

(Continued)

OTHER PUBLICATIONS

Adaptive cruise control simulator: a low-cost, multiple-driver-in-the-loop simulator; Guvenc, B.A.; Kural, E.; Control Systems Magazine, IEEE; vol. 26, Issue 3, Jun. 2006 pp. 42-55; Digital Object Identifier 10.1109/MCS.2006.1636309.*

(Continued)

*Primary Examiner*—Cuong H. Nguyen
(74) *Attorney, Agent, or Firm*—Global IP Counselors, LLP

(57) ABSTRACT

A preceding vehicle following cruise control is configured to shift automatically from a low speed following cruise control mode to a high speed following cruise control mode when a vehicle speed changes from a low speed region to a high speed region while a vehicle speed setting is set. Alternatively, the preceding vehicle following cruise control system is configured to shift automatically from the low speed following cruise control mode to the high speed following cruise control mode when the vehicle speed changes from the low speed region to the high speed region while a history of mode switching operation history indicating that the following cruise control mode has been changed from the low speed following cruise control mode to the high speed following cruise control mode is stored in a memory section.

15 Claims, 4 Drawing Sheets

U.S. PATENT DOCUMENTS

| | | | |
|---|---|---|---|
| 6,345,222 B1 * | 2/2002 | Toukura et al. | 701/53 |
| 6,370,470 B1 * | 4/2002 | Yamamura et al. | 701/96 |
| 6,466,883 B1 * | 10/2002 | Shim | 702/94 |
| 6,594,574 B2 * | 7/2003 | Isogai et al. | 701/96 |
| 6,600,988 B1 * | 7/2003 | Da et al. | 701/93 |
| 6,674,360 B2 * | 1/2004 | Nakamura et al. | 340/435 |
| 6,678,603 B2 * | 1/2004 | Egawa et al. | 701/96 |
| 6,882,923 B2 * | 4/2005 | Miller et al. | 701/96 |
| 6,966,862 B2 * | 11/2005 | Inuta | 475/119 |
| 7,200,482 B2 * | 4/2007 | Kawarasaki | 701/97 |
| 2005/0055150 A1 | 3/2005 | Uhler et al. | |

FOREIGN PATENT DOCUMENTS

| | | | |
|---|---|---|---|
| EP | 1075978 A | | 2/2001 |
| EP | 1616744 A1 * | | 1/2006 |
| EP | 1824700 A1 * | | 8/2007 |
| GB | 2301905 A * | | 12/1996 |
| JP | 2001030797 A * | | 2/2001 |
| JP | 2001310650 A * | | 11/2001 |
| JP | 2002012053 A * | | 1/2002 |
| JP | 2002/234358 A | | 8/2002 |
| JP | 2004150454 A * | | 5/2004 |
| JP | 2006327531 A * | | 12/2006 |
| JP | 2007315550 A * | | 12/2007 |

OTHER PUBLICATIONS

Control of Integrated Powertrain With Electronic Throttle and Automatic Transmission; Kim, D.; Peng, H.; Bai, S.; Maguire, J. M.; Control Systems Technology, IEEE Transactions on; vol. 15, Issue 3, May 2007 pp. 474-482; Digital Object Identifier 10.1109/TCST. 2007.894641.*

Longitudinal maneuver design in coordination layer for automated highway system; Joo, S.; Lu, X.Y.; Hedrick, J.K.; American Control Conference, 2003. Proceedings of the 2003; vol. 1, Jun. 4-6, 2003 pp. 42-47 vol. 1; Digital Object Identifier 10.1109/ACC.2003.1238911.*

21st century cars and ICs; Noda, N.; Solid-State Circuits Conference, 2000. Digest of Technical Papers. ISSCC. 2000 IEEE International Feb. 7-9, 2000 pp. 12-17; Digital Object Identifier 10.1109/ISSCC. 2000.839676.*

Intelligent controller design for electric vehicle; Poorani, S.; Kumar, K.U.; Renganarayanan, S.; Vehicular Technology; Conference, 2003. VTC 2003-Spring. The 57th IEEE Semiannual; vol. 4, Apr. 22-25, 2003 pp. 2447-2450 vol. 4; Digital Object Identifier 10.1109/ VETECS.2003.1208830.*

Application and optimization of neural field dynamics for driver assistance; Edelbrunner, H.; Handmann, U.; Igel, C.; Leefken, I.; von Seelen, W.; Intelligent Transportation Systems, 2001. Proceedings. 2001 IEEE; Aug. 25-29, 2001 pp. 309-314; Digital Object Identifier 10.1109/ITSC.2001.948674.*

Model-based neural distance control for autonomous road vehicles; Fritz, H.; Intelligent Vehicles Symposium, 1996., Proceedings of the 1996 IEEE; Sep. 19-20, 1996 pp. 29-34, Digital Object Identifier 10.1109/IVS.1996.566346.*

Realisation of an intelligent cruise control system utilizing classification of distance, relative speed and vehicle speed information Hoess, A.; Intelligent Vehicles '94 Symposium, Proceedings of the; Oct. 24-26, 1994 pp. 7-12; Digital Object Identifier 10.1109/IVS. 1994.639461.*

Automotive Electronics In Passenger Cars; Numazawa, A.; Transportation Electronics, 1988. Convergence 88. International Congress on; Oct. 17-18, 1988 pp. 11-24.*

Control strategies for hybrid vehicles: optimal control; Delprat, S.; Guerra, T.M.; Rimaux, J.; Vehicular Technology Conference, 2002. Proceedings. VTC 2002-Fall. 2002 IEEE 56th; vol. 3, Sep. 24-28, 2002 pp. 1681-1685 vol. 3; Digital Object Identifier 10.1109/ VETECF.2002.1040502.*

* cited by examiner

PRECEDING VEHICLE FOLLOWING CRUISE CONTROL SYSTEM

CROSS-REFERENCE TO RELATED APPLICATIONS

This application claims priority under 35 U.S.C. § 119 to Japanese Patent Application No. 2004-209971. The entire disclosure of Japanese Patent Application No. 2004-209971 is hereby incorporated herein by reference.

BACKGROUND OF THE INVENTION

1. Field of the Invention

The present invention relates to a preceding vehicle following cruise control system.

2. Background Information

Japanese Laid-Open Patent Publication No. 2002-234358 discloses a conventional preceding vehicle following cruise control system in a total range of vehicle speeds (0 to 100 km/h) in which a preceding vehicle following cruise control (i.e., a following cruise control) is executed is divided into a plurality of vehicle speed regions. The conventional preceding vehicle following cruise control system is configured to execute the following cruise control so that a host vehicle follows a preceding vehicle in a manner corresponding to the vehicle speed region in which the host vehicle is traveling.

In view of the above, it will be apparent to those skilled in the art from this disclosure that there exists a need for an improved preceding vehicle following cruise control system. This invention addresses this need in the art as well as other needs, which will become apparent to those skilled in the art from this disclosure.

SUMMARY OF THE INVENTION

It has been discovered that in to in the conventional preceding vehicle following cruise control system described above, a prescribed operating member (e.g., a switch) must be operated in order to switch the preceding vehicle following cruise control from the low speed region to the high speed region. Consequently, when the preceding vehicle in front of the host vehicle accelerates while the preceding vehicle following cruise control system is executing the following cruise control in the low speed region, the following cruise control will not continue unless the driver operates the prescribed operating member. This is troublesome for the driver because he or she must operate the operating member in order to continue using the following cruise control in the high speed region.

Accordingly, one object of the present invention is to provide a preceding vehicle following cruise controls system that can improve convenience of shifting operation by eliminating operation of switches during shifting from the low speed region to the high speed region when there is no problem if the shifting from the low speed region to the high speed region is automatically performed because the host vehicle has already experienced the following cruise control in the high speed region previously.

In order to achieve the above mentioned object and other objects of the present invention, a preceding vehicle following cruise control system is provided that basically comprises a vehicle speed detecting section, a preceding vehicle detecting section, and a following cruise control section. The vehicle speed detecting section is configured and arranged to detect a vehicle speed of a host vehicle. The preceding vehicle detecting section is configured and arranged to detect a preceding vehicle in front of the host vehicle. The following cruise control section is configured and arranged to selectively execute based on a driving condition one of a high speed following cruise control mode in a high speed region and a low speed following cruise control mode in a low speed region, and to automatically shift from the low speed following cruise control mode to the high speed following cruise control mode when an automatic mode shifting condition indicating the high speed following cruise control mode was previously executed is satisfied and when the vehicle speed changes from the low speed region to the high speed region.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
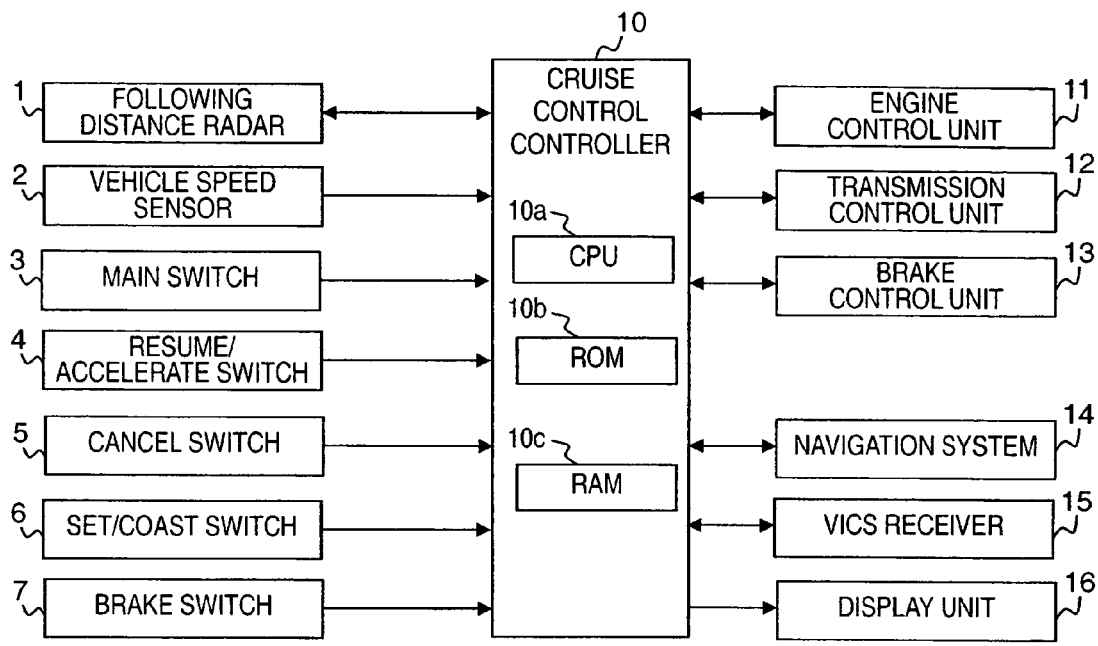
FIG. 1 is a block diagram illustrating constituent features of a preceding vehicle following cruise control system in accordance with a preferred embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In the preceding vehicle following cruise control system in accordance with a first embodiment of the present invention, a total range of vehicle speeds in which a preceding vehicle following cruise control (i.e., the following cruise control) is executed is divided into two regions, i.e., a low speed region and a high speed region. The preceding vehicle following control system is configured to selectively execute a following cruise control mode for the low speed region (hereinafter called "low speed following cruise control mode") and a following cruise control mode for the high speed region (hereinafter called "high speed following cruise control mode") so that the following cruise control is executed in all speed regions of the total range of vehicle speeds. The "total range of vehicle speeds" as used herein means a substantially entire range of vehicle speeds that ranges from a minimum vehicle speed at which the following cruise control is executed to a maximum vehicle speed at which the following cruise control is executed. For example, the minimum vehicle speed of the total range of vehicle speeds is set to 0 km/h or a very low speed (e.g., 10 km/h), and the maximum vehicle speed of the total range of vehicle speeds is set to a legal speed limit (e.g., 100 km/h) or a higher speed.

In the preceding vehicle following cruise control system, the low speed following cruise control mode is used in a low speed region that ranges from the minimum vehicle speed (i.e., 10 km/h in this preferred embodiment) at which preceding vehicle following cruise control is executed to the upper speed limit for the low speed following cruise control mode (i.e., 40 km/h in this preferred embodiment). In the low speed following cruise control mode, the preceding vehicle following cruise control system is configured to execute the following cruise control such that a vehicle in which the cruise control system is installed (hereinafter referred as "host vehicle") follows a preceding vehicle while maintaining a preset following distance when the preceding vehicle is detected in front of the host vehicle, and to abort the following cruise control when the preceding vehicle is not detected in front of the host vehicle.

On the other hand, the high speed following cruise control mode is also called an adaptive cruise control (ACC) mode, and is used in a high speed region that ranges from a lower speed limit (e.g., 35 km/h in the first embodiment) for the high speed following cruise control mode to the maximum vehicle speed (e.g., 110 km/h in the first embodiment) of the total range of vehicle speeds. In the high speed following cruise control mode, the preceding vehicle following cruise control system is configured to execute the preceding vehicle following cruise control in which one of a constant speed cruise control and the following cruise control is executed depending on whether the preceding vehicle is detected. More specifically, the preceding vehicle following cruise control system is configured to execute the constant speed cruise control such that the host vehicle travels in a constant-speed state at a vehicle cruising speed (hereinafter called "vehicle speed setting") for the high speed following cruise control mode when the preceding vehicle is not detected in front of the host vehicle, and to execute the following cruise control such that the host vehicle follows the preceding vehicle while maintaining a preset following distance (first prescribed following distance) when the preceding vehicle is detected.

A driver of the host vehicle can set the vehicle speed setting to any desired speed between the lower speed limit of the high speed following cruise control mode (i.e., 35 km/h in this preferred embodiment) and the maximum vehicle speed (i.e., 110 km/h in this preferred embodiment) at which the preceding vehicle following cruise control is executed. This preferred embodiment presents an example in which the upper speed limit of the low speed following cruise control mode is 40 km/h and the lower speed limit of the high speed following cruise control mode is 35 km/h such that the total range of vehicle speeds at which preceding vehicle following cruise control is executed is divided into two overlapping regions, i.e., such that the low speed region and the high speed region overlap each other. However, it will be apparent to those skilled in the art from this disclosure that it is also acceptable to define the high speed region and the low speed regions such that they do not overlap each other. For example, the low speed region can be set to range from 10 to 40 km/h and the high speed region can be set to range from 40 km/h to 110 km/h.

FIG. 1 is a block diagram illustrating constituent components of the preceding vehicle following cruise control system in accordance with the preferred embodiment. As seen in FIG. 1, the preceding vehicle following cruise control system of the preferred embodiment has a following following cruise control controller 10 that is operatively coupled to various sensors and switches including a following distance radar 1, a vehicle speed sensor 2, a main switch 3, a resume/accelerate switch 4, a cancel switch 5, a set/coast switch 6 and a brake switch 7. The following following cruise control controller 10 is also operatively coupled to an engine control unit 11, a transmission control unit 12, a brake control unit 13, a navigation system 14, a VICS (Vehicle Information and Communication System) receiver 15 and a display unit 16.

The following distance radar 1 is configured and arranged to sweep a laser beam in front of the host vehicle to detect a preceding vehicle and to detect a distance from the host vehicle to the preceding vehicle (i.e., the following distance). Alternatively, a milliwave following distance radar that uses milliwaves can be used for the following distance radar 1 to detect the following distance instead of a laser beam radar. The vehicle speed sensor 2 is configured and arranged to detect a traveling speed of the host vehicle. The main switch 3 is an operating member for starting the preceding vehicle following cruise control system. When the main switch 3 is on, power is being supplied to the preceding vehicle following cruise control system. The resume/accelerate switch 4 is an operating member used to resume the preceding vehicle following cruise control at the same vehicle speed setting as was previously used or to increase the vehicle speed setting. More specifically, if the preceding vehicle following cruise control is not in progress when the resume/accelerate switch 4 is operated, the preceding vehicle following cruise control is resumed using the vehicle speed setting for the high speed following cruise control mode that was used the previous time the high speed following cruise control mode was executed. On the other hand, if the preceding vehicle following cruise control is in progress when the resume/accelerate switch 4 is operated, the vehicle speed setting used in the constant speed cruise control for the high speed following cruise control mode is increased.

Figure 2:
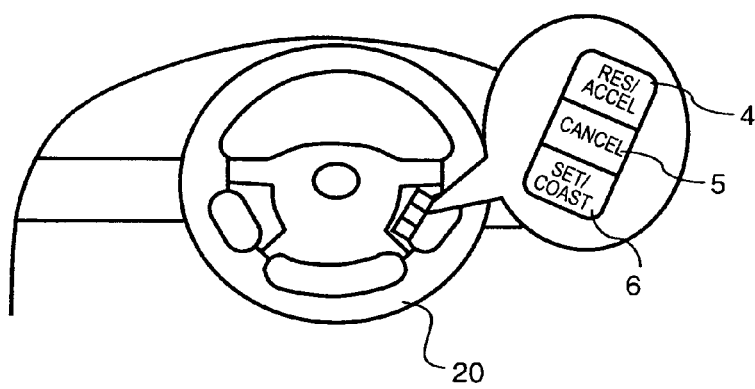
FIG. 2 is a schematic diagram of a steering wheel portion of a host vehicle illustrating positional arrangements of a plurality of operating members of the preceding vehicle following cruise control system of the preferred embodiment of the present invention.

The cancel switch 5 is an operating member for canceling the preceding vehicle following cruise control. The set/coast switch 6 is an operating member used to start the preceding vehicle following cruise control when the preceding vehicle following cruise control is not already in progress and used to reduce the vehicle speed setting used in the constant speed cruise control for the high speed following cruise control mode when the preceding vehicle following cruise control is already in progress. When the set/coast switch 6 is operated while the preceding vehicle following cruise control is not in progress, the preceding vehicle following cruise control starts if the preceding vehicle is detected and the constant speed cruise control starts by setting the vehicle speed setting to a vehicle speed at that time if the preceding vehicle is not detected in the high speed region. As mentioned above, the constant speed cruise control is configured to control the host vehicle to travel at the vehicle speed setting in the high speed following cruise control mode. The resume/accelerate switch 4, the cancel switch 5, and the set/coast switch 6 are preferably provided on a spoke portion of the steering wheel of the host vehicle as shown in FIG. 2 so that the driver of the host vehicle can operate the resume/accelerate switch 4, the cancel switch 5, and the set/coast switch 6 while sitting on a driver's seat. The brake switch 7 is turned on when the brake pedal (not shown) is depressed.

The cancel switch 5 is an operating member for canceling the preceding vehicle following cruise control. The set/coast switch 6 is an operating member used to start preceding vehicle following cruise control when preceding vehicle following cruise control is not already in progress and to reduce the vehicle speed setting used for constant speed control when preceding vehicle following cruise control is already in progress. When the set/coast switch 6 is operated while preceding vehicle following cruise control is not in progress, preceding vehicle following cruise control starts if a preceding vehicle exists and constant speed cruise control using the current vehicle speed as the vehicle speed setting starts if a preceding vehicle does not exist. The resume/accelerate switch 4, the cancel switch 5, and the set/coast switch 6 are provided on the spoke portion of a steering wheel 20. The brake switch 7 is turned on when the brake pedal (not shown) is depressed.

The following cruise control controller 10 preferably includes a microcomputer with the preceding vehicle following cruise control program and the constant speed cruise control program described above to control the preceding vehicle following cruise control system as discussed below. More specifically, as seen in FIG. 1, the following cruise control controller 10 includes a CPU 10*a*, a ROM (Read Only Memory) 10*b*, and a RAM (Random Access Memory) 10*c*. The following cruise control controller 10 can also include other conventional components such as an input interface circuit, an output interface circuit, and the like. The microcomputer of the following cruise control controller 10 is programmed to control the preceding vehicle following cruise control. The memory circuit stores processing results and control programs such as ones for the preceding vehicle following cruise control operation that are run by the processor circuit. The following cruise control controller 10 is operatively coupled to the various sensors and switches in a conventional manner. The internal RAM 10*c* of the following cruise control controller 10 stores statuses of operational flags and various control data. The internal ROM 10*b* of the cruise control controller stores the various data and maps for various operations. The following cruise control controller 10 is capable of selectively controlling any of the components of the preceding vehicle following cruise control system in accordance with the control program. It will be apparent to those skilled in the art from this disclosure that the precise structure and algorithms for the following cruise control controller 10 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The engine control unit 11 is configured to execute air intake quantity control, fuel injection control, and ignition timing control of an engine (not shown) to regulate the output torque and the rotational speed of the engine and to control the drive force of the host vehicle. The transmission control unit 12 is configured to control the gear ratio, i.e., shift position, of an automatic transmission (not shown) of the host vehicle. The brake control unit 13 is configured to control the braking force of the host vehicle by adjusting the brake fluid pressure.

The navigation device 14 is configured to detect the current position of the host vehicle and to provide information regarding map/traffic information such as the legal speed limit of the road on which the host vehicle is traveling. The VICS receiver 15 is configured to receive traffic congestion information from a light beacon, radio wave beacon, or FM multiplexed broadcast, and the like. The display unit 16 is configured to indicate the control state of the preceding vehicle following cruise control system and the cruising state of the host vehicle.

In the preferred embodiment of the present invention, the following cruise control controller 10 is configured to shift to the preceding vehicle following cruise control in the low speed following cruise control mode unconditionally when the speed of the host vehicle falls to 40 km/h or less while the preceding vehicle following cruise control is executed in the high speed following cruise control mode. However, the following cruise control controller 10 is not configured to shift unconditionally to the preceding vehicle following cruise control in the high speed following cruise control mode when the speed of the host vehicle rises to 40 km/h or higher while the preceding vehicle following cruise control is executed in the low speed following cruise control mode. In the latter case, the preceding vehicle following cruise control system will not shift automatically unless the vehicle speed setting is stored in a prescribed address of the RAM 10*c*. When the vehicle speed setting is stored in the RAM 10*c*, the driver has experienced the following cruise control in the high speed following cruise control mode at least once during the current driving session. Thus, it is reasonable to believe that the driver will not feel uncomfortable if the host vehicle shifts automatically from the low speed following cruise control mode to the high speed following cruise control mode. As a result, there is no need for the driver to manually operate the set/coast switch 6 in order to shift to the high speed following cruise control mode when there is no reason why shifting automatically to the high speed following cruise control mode should be a problem. Thus, the preceding vehicle following cruise control system of the present invention is more convenient with respect to switching (changing) the following cruise control mode from the low speed region to the high speed region.

Figure 3:
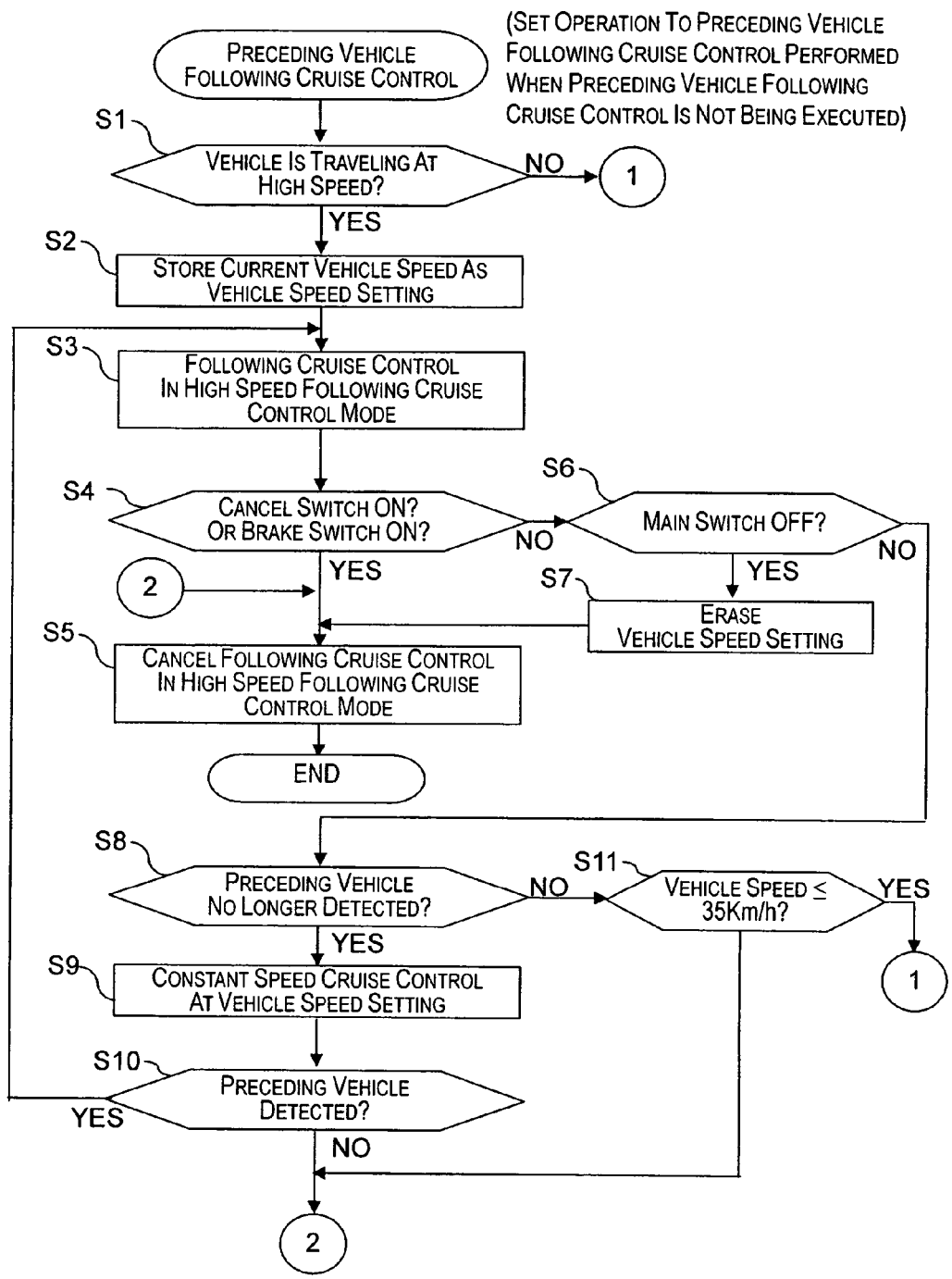
FIG. 3 is a flowchart describing a preceding vehicle following cruise control process executed in the preceding vehicle following cruise control system in accordance with the preferred embodiment of the present invention.
Figure 4:
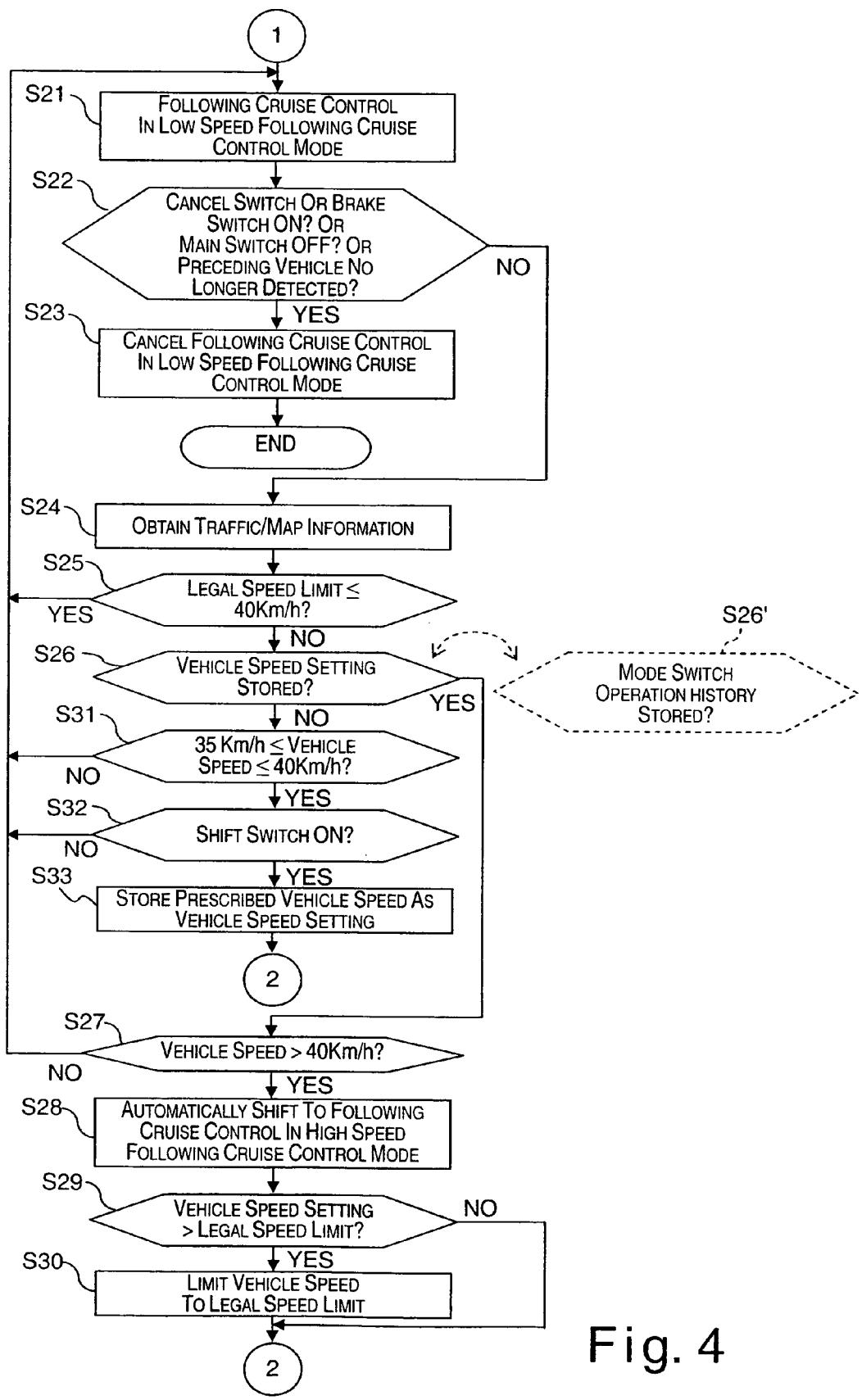
FIG. 4 is a flowchart of the preceding vehicle following cruise control process continued from the flowchart of FIG. 3 executed in the preceding vehicle following cruise control system in accordance with the preferred embodiment of the present invention.

The operation of the embodiment will now be described with reference to the flowchart shown in FIGS. 3 and 4. FIGS. 3 and 4 are the flowchart describing a control process executed in the following cruise control controller 10 for executing the preceding vehicle following cruise control in accordance with this preferred embodiment. The following cruise control controller 10 is configured to start executing the program illustrated in FIGS. 3 and 4 when the set/coast switch 6 is operated at a time when the preceding vehicle following cruise control is not already being executed.

In step S1 of FIG. 3, the following cruise control controller 10 is configured to check the current vehicle speed detected by the vehicle speed sensor 2 and to determine if the host vehicle speed is larger than 40 km/h, i.e., if the vehicle is traveling at a high speed that is larger than the upper speed limit of the low speed region. If the host vehicle is traveling at a high speed in step S1, the following cruise control controller 10 is configured to proceed to step S2. In step S2, the following cruise control controller 10 is configured to execute the processing required to start the preceding vehicle following cruise control in the high speed following cruise control mode. On the other hand, if the host vehicle is traveling at a low speed (i.e., 40 km/h or less in this preferred embodiment) in step S1, the following cruise control controller 10 is configured to proceed to step S21 of FIG. 4 and to execute the processing required to start the preceding vehicle following cruise control in the low speed following cruise control mode.

Figure 5:
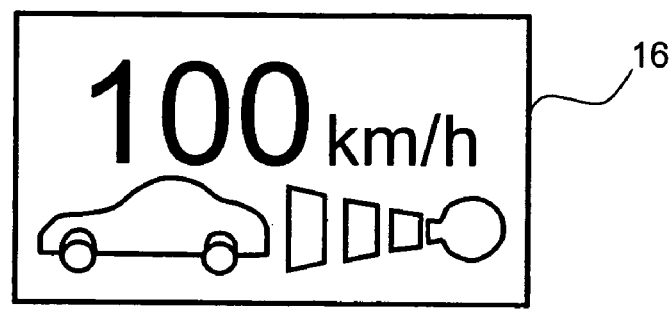
FIG. 5 is a schematic diagram illustrating an example of an image displayed in a display unit of the preceding vehicle following cruise control system during a high speed following cruise control mode in accordance with the preferred embodiment of the present invention.

The processing required to start the preceding vehicle following cruise control in the high speed following cruise control mode will now be described. In step S2, the following cruise control controller 10 is configured to store the current vehicle speed detected by the vehicle speed sensor 2 as a cruising speed that is used for the constant speed cruise control in the high speed following cruise control mode (i.e., the "vehicle speed setting") in a prescribed address of the RAM 10c. Then in step S3, the following cruise control controller 10 is configured to start executing the preceding vehicle following cruise control in the high speed following cruise control mode. More specifically, the following cruise control controller 10 is configured to execute a following distance control such that the following distance detected by the following distance radar 1 matches a preset target following distance and the host vehicle follows the preceding vehicle. When the preceding vehicle following cruise control system is executing the preceding vehicle following cruise control in the high speed following cruise control mode, the display unit 16 is configured and arranged to display an indicator or mark indicating that the preceding vehicle following cruise control system is in the high speed following cruise control mode as shown in FIG. 5. FIG. 5 illustrates an example of an image displayed in the display unit 16 when the following cruise control is being executed in the high speed following cruise control mode with the vehicle speed setting of 100 km/h.

In step S4, the following cruise control controller 10 is configured to check if the cancel switch 5 has been operated (i.e., if the cancel switch 5 is on) or if the brake pedal has been depressed and the brake switch 7 is on. If the cancel switch 5 or the brake switch 7 is on in step S4, the following cruise control controller 10 is configured to proceed to step S5. In step S5, the following cruise control controller 10 is configured to cancel the preceding vehicle following cruise control in the high speed following cruise control mode and to end the control sequence.

On the other hand, if the cancel switch 5 has not been operated and the brake pedal has not been depressed in step S4, the following cruise control controller 10 is configured to proceed to step S6 and to determine if the main switch 3 has been turned off. If the main switch 3 is off in step S6, the following cruise control controller 10 is configured to proceed to step S7. In step S7, the following cruise control controller 10 is configured to erase the vehicle speed setting stored in the prescribed address of the RAM 10c and to proceed to step S5 where the following cruise control controller 10 is configured to cancel the preceding vehicle following cruise control in the high speed following cruise control mode and to end the control sequence.

If neither the cancel switch 5 nor the main switch 3 have been operated and the brake pedal has not been depressed, the following cruise control controller 10 is configured to proceed to step S8 and to determine if the following distance radar 1 has lost sight of (no longer detects) the preceding vehicle. If the preceding vehicle is no longer detected, the following cruise control controller 10 is configured to proceed to step S9. In step S9, the following cruise control controller 10 is configured to execute a vehicle speed control such that the vehicle speed detected by the vehicle speed sensor 2 matches the vehicle speed setting stored in the prescribed address of the RAM 10c, and thus, the host vehicle travels at a constant speed (the constant speed cruise control).

In step S10, the following cruise control controller 10 is configured to check if a preceding vehicle has been detected again by the following distance radar 1 during the constant speed cruise control. If a preceding vehicle is detected, the following cruise control controller 10 is configured to return to step S3 and to execute the following distance control such that the following distance detected by the following distance radar 1 matches the preset target following distance and the host vehicle follows the preceding vehicle. On the other hand, if a preceding vehicle is still not detected in step S10, the following cruise control controller 10 returns to step S4 and to repeat the processing steps just described above.

If the preceding vehicle is not lost (i.e., if the preceding vehicle is still detected) in step S8, the following cruise control controller 10 is configured to proceed to step S11 and to check if the current vehicle speed detected by the vehicle speed sensor 2 is equal to or less than 35 km/h. If the vehicle speed exceeds 35 km/h in step S11, the following cruise control controller 10 is configured to return to step S4 and to repeat the processing steps described above. Conversely, if the vehicle speed is equal to or less than 35 km/h in step S11, the following cruise control controller 10 is configured to proceed to step S21 of FIG. 4 and thereby shift from the high speed following cruise control mode to the low speed following cruise control mode.

More specifically, in step S21, the following cruise control controller 10 is configured to execute the following distance control such that the following distance detected by the following distance radar 1 matches a preset target following distance and the host vehicle follows the preceding vehicle using the low speed following cruise control mode.

If the set/coast switch 6 is operated when the preceding vehicle following cruise control is not in progress and it is determined in step S1 that the host vehicle is not traveling at a high speed of 35 km/h or higher, the following cruise control controller 10 proceeds to step S21 and to start the preceding vehicle following cruise control in the low speed following cruise control mode.

Figure 6:
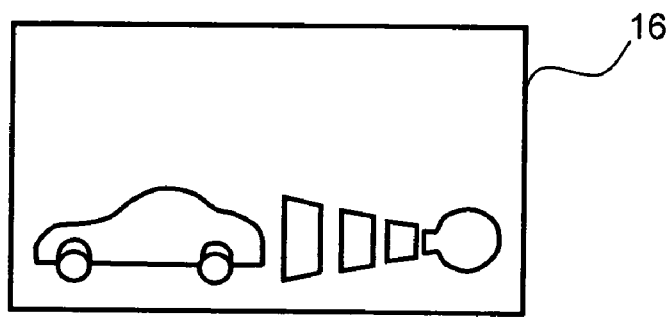
FIG. 6 is a schematic diagram illustrating an example of an image displayed in the display unit of the preceding vehicle following cruise control system during a low speed following cruise control mode in accordance with the preferred embodiment of the present invention.

When the preceding vehicle following cruise control system is executing the following cruise control in the low speed following cruise control mode, the display unit 16 is configured to display an indicator or mark like that shown in FIG. 6 to inform the driver of the host vehicle that the preceding vehicle following cruise control system is in the low speed following cruise control mode. While the mark indicating the high speed following cruise control mode shown in FIG. 5 displays the vehicle speed setting (100 km/h in FIG. 5), the mark indicating the low speed following cruise control mode does not display the vehicle speed setting because the vehicle speed setting is not in effect in the low speed following cruise control mode. Thus, the driver can recognize which one of the following cruise control modes is in progress based on whether or not the vehicle speed setting is displayed in the display unit 16.

Figure 7:
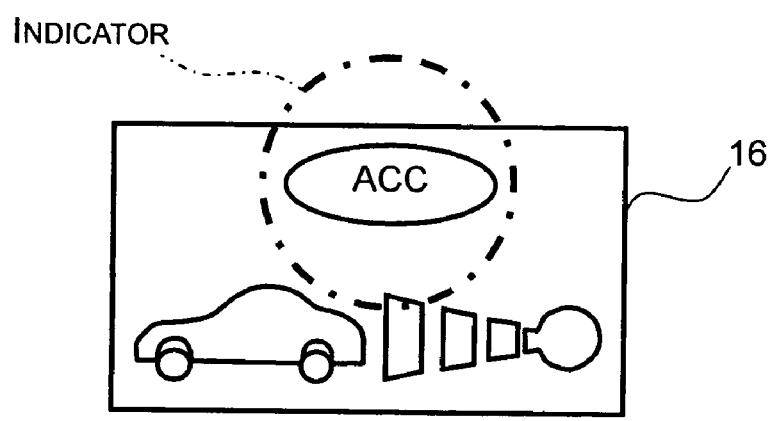
FIG. 7 is a schematic diagram illustrating an example of an image displayed in the display unit of the preceding vehicle following cruise control system during an automatic shifting ready state in which the preceding vehicle following cruise control system is ready to automatically shift from the low speed following cruise control mode to the high speed following cruise control mode in accordance with the preferred embodiment of the present invention.

When the preceding vehicle following cruise control system is executing the preceding vehicle following cruise control in the low speed following cruise control mode while the vehicle speed setting is stored in the prescribed address of the RAM 10c (i.e., when an automatic mode shifting condition is satisfied), the preceding vehicle following cruise control system is configured to shift automatically from the low speed following cruise control mode to the high speed following cruise control mode when the vehicle speed exceeds 40 km/h. As used herein "automatically shift" means the shifting from the high speed following control mode to the low speed following control mode is executed without the driver operating the operation members (such as the resume/accelerate switch 4). Therefore, an indicator or mark like that shown in FIG. 7 is displayed on the display unit 16 to inform the driver that the following cruise control can be shift automatically from the low speed following cruise control mod to the high speed following cruise control mode. The mark shown in FIG. 7 consists of the mark for the low speed following cruise control mode shown in FIG. 6 with an "ACC" indicator added thereto. Thus, the mark shown in FIG. 7 enables the driver to recognize that the preceding vehicle following cruise control system is currently executing the preceding vehicle following cruise control in the low speed following cruise control mode and that the preceding vehicle following cruise control system is ready to shift automatically to the high speed following cruise control mode at any time if the vehicle speed exceeds 40 km/h.

After preceding vehicle following cruise control in the low speed following cruise control mode is started, the following cruise control controller 10 is configured to proceed to step S22 and to check if either the cancel switch 5 or the brake switch 7 is on, if the main switch 3 is off, and if the following distance radar 1 has lost sight of the preceding vehicle. If the cancel switch 5 has been operated, the brake pedal has been depressed, the main switch 3 has been operated, or the preceding vehicle is not longer detected in step S22, then the following cruise control controller 10 is configured to proceed to step S23. In step S23, the following cruise control controller 10 is configured to cancel the preceding vehicle following cruise control in the low speed following cruise control mode and to end the control sequence. Conversely, if the cancel switch 5 has not been operated, the brake pedal has not been depressed, the main switch 3 has not been operated, and the preceding vehicle is still detected (has not been lost) in step S22, then the following cruise control controller 10 is configured to proceed to step S24.

In step S24, the following cruise control controller 10 is configured to acquire road information regarding the road on which the host vehicle is traveling from the navigation device 14 and the VICS receiver 15. In step S25, the following cruise control controller 10 is configured to extract the legal speed limit of the road from the road information and to determine if the legal speed limit is equal to or lower than 40 km/h. In this preferred embodiment, the upper speed limit of the low speed following cruise control mode is set to be 40 km/h. If the legal speed limit of the road on which the host vehicle is traveling is 40 km/h or lower, the following cruise control controller 10 is configured to proceed to step S21 and to continue executing the preceding vehicle following cruise control in the low speed following cruise control mode because, depending on the vehicle speed setting, the vehicle speed might exceed the legal speed limit if the preceding vehicle following cruise control system shifts from the low speed following cruise control mode to the high speed following cruise control mode while the host vehicle is traveling on the road whose legal speed limit is 40 km/h or lower.

If in step S25 the legal speed limit is determined to be over 40 km/h, the following cruise control controller 10 is configured to proceed to step S26 and to check if the vehicle speed setting is stored in the prescribed address of the RAM 10c. If the vehicle speed setting is not stored in the prescribed address of the RAM 10c in step S26, the following cruise control controller 10 is configured to proceed to step S31. In step S31, the following cruise control controller 10 is configured to determine if the current vehicle speed detected by the vehicle speed sensor 2 is in the region ranging from 35 to 40 km/h (i.e., the overlapping region between the high speed region and the low speed region). The following cruise control controller 10 is configured to proceed to step S32 if the vehicle speed is in the overlapping region, and to return to step S21 to continue the preceding vehicle following control in the low speed following cruise control mode if the vehicle speed is not in the overlapping region.

In step S32, the following cruise control controller 10 is configured to determine if a shift switch (e.g., the resume/accelerate switch 4) configured to allow the driver to instruct the preceding vehicle following cruise control system to shift to the high speed following cruise control mode has been operated. If the shift switch has been operated, the following cruise control controller 10 is configured to proceed to step S33.

In step S33, the following cruise control controller 10 is configured to store a prescribed vehicle speed, e.g., 40 km/h (the upper speed limit of the low speed following cruise control mode), as the vehicle speed setting in the prescribed address of the RAM 10c. Then, the following cruise control controller 10 is configured to proceed to step S4 to execute the preceding vehicle following control in the high speed following cruise control mode. On the other hand, if it is determined that the shift switch has not been operated in step S32, the following cruise control controller 10 is configured to return to step S21 and to continue executing the preceding vehicle following control in the low speed following cruise control mode.

If in step S26 it finds that a vehicle speed setting is stored in the prescribed address of the RAM 10c, the following cruise control controller 10 is configured to proceed to step S27 and to check if the current vehicle speed detected by the vehicle speed sensor 2 exceeds 40 km/h. If the vehicle speed does not exceed 40 km/h in step S27, the following cruise control controller 10 is configured to return to step S21 and to continue executing the preceding vehicle following control in the low speed following cruise control mode. Conversely, if the vehicle speed exceeds 40 km/h in step S27, the following cruise control controller 10 is configured to proceed to step S28 and to automatically shift from the low speed following cruise control mode to the high speed following cruise control mode. More specifically, in step S28, the following cruise control controller 10 is configured to execute the following distance control such that the following distance detected by the following distance radar 1 matches a preset target following distance and the vehicle follows the preceding vehicle using the high speed following cruise control mode.

Since the preceding vehicle following cruise control system is executing the following cruise control in the high speed following cruise control mode, the display unit 16 is configured to display the indicator indicating that the preceding vehicle following cruise control system is in the high speed following cruise control mode as shown in FIG. 5. As mentioned above, FIG. 5 illustrates a case in which high speed following cruise control is being executed with the vehicle speed setting of, for example, 100 km/h. In step S29, the following cruise control controller 10 is configured to determine if the vehicle speed setting exceeds the legal speed limit of the road on which the host vehicle is traveling. If the vehicle speed setting exceeds the legal speed limit in step S29, the following cruise control controller 10 is configured to proceed to step S30 and to limit the vehicle speed to a speed equal to or lower than the legal speed limit. Then, the following cruise control controller 10 is configured to return to step S4 and to repeat the processing described previously.

Accordingly, the preceding vehicle following cruise control system of this preferred embodiment is configured to automatically shift from the low speed following cruise control mode to the high speed following cruise control mode when the vehicle speed enters the high speed region from the low speed region while the vehicle speed setting has been set (i.e., the vehicle speed setting is stored in the prescribed address of the RAM 10c). As a result, when the driver has already experienced the following cruise control in the high speed following cruise control mode once in the current control cycle of the preceding vehicle following cruise control, and there is no reason why shifting automatically to the high speed following cruise control mode should be a problem, the preceding vehicle following cruise control system is configured to shift to the high speed following cruise control mode automatically without the need for the driver to change the mode manually by operating the set/coast switch 6. Thus, the preceding vehicle following cruise control system is more convenient with respect to switching (changing) between the low speed following cruise control mode and the high speed following cruise control mode.

With this preferred embodiment, the preceding vehicle following cruise control system is configured to detect the legal speed limit of the road on which the host vehicle is traveling and does not automatically shift from the low speed following cruise control mode to the high speed following cruise control mode if the legal speed limit of the road on which the host vehicle is traveling is equal to or lower than the upper speed limit of the low speed region (i.e., 40 km/h in this preferred embodiment). As a result, a situation in which the host vehicle accelerates to a vehicle speed exceeding the legal speed limit while following the preceding vehicle can be prevented.

Moreover, with this preferred embodiment, the preceding vehicle following cruise control system is configured to detect the legal speed limit of the road on which the host vehicle is traveling and to limit the vehicle speed to the legal speed limit if the vehicle speed setting exceeds the legal speed limit after the following cruise control mode switches from the low speed following cruise control mode to the high speed following cruise control mode. As a result, a situation in which the host vehicle accelerates to a vehicle speed exceeding the legal speed limit while following the preceding vehicle can be prevented.

Furthermore, with the preceding vehicle following cruise control system of this preferred embodiment, the driver is informed when the preceding vehicle following cruise control system shifts automatically from the low speed following cruise control mode to the high speed following cruise control mode. As a result, the driver can be made aware that the following cruise control mode has shifted (changed) and will not experience an uncomfortable feeling if the host vehicle accelerates automatically in order to follow a preceding vehicle after the automatic mode shift from the low speed following cruise control mode to the high speed following cruise control mode.

Also, with the preceding vehicle following cruise control system of this preferred embodiment, the driver is informed when the preceding vehicle following cruise control system is in a state in which the preceding vehicle following cruise control system can shift automatically from the low speed following cruise control mode to the high speed following cruise control mode. As a result, the driver can be aware that the mode may shift automatically to the high speed following cruise control mode and will not experience an uncomfortable feeling if the host vehicle accelerates automatically in order to follow a preceding vehicle after the mode shifts automatically.

In the preferred embodiment as described above, the vehicle speed sensor 2 preferably corresponds to the vehicle speed detecting section of the present invention. The following distance radar 1 preferably corresponds to the preceding vehicle detecting section of the present invention. The following cruise control controller 10 preferably corresponds to the following cruise control section, the constant speed cruise control section, the mode switching section, and the vehicle speed limiting section of the present invention. The navigation unit 14 and the VICS receiver 15 preferably correspond to the road information detecting section of the present invention. The display unit 16 preferably corresponds to the reporting section of the present invention. The set/coast switch 6 preferably corresponds to the mode switching operating member of the present invention. The RAM 10c preferably corresponds to the memory section of the present invention. The constituent elements are not limited to those described herein so long as the characteristic functions of the present invention are not lost.

Although the preferred embodiment described herein presents an example in which the preceding vehicle following cruise control system in accordance with the present invention is applied to an automobile that uses an engine as a drive source, the invention can also be applied to hybrid vehicles and electric vehicles in addition to engine-powered vehicles.

Although the preferred embodiment described herein presents an example in which the total range of vehicle speeds at which the preceding vehicle speed following cruise control is executed is divided into two vehicle speed regions, i.e., the high speed region (high speed following cruise control mode) and the low speed region (low speed following cruise control mode), it is also acceptable to divide the total range of vehicle speeds into three or more speed regions. Furthermore, the invention is not limited to the specific values mentioned in the preferred embodiment regarding the maximum vehicle speed and minimum vehicle speed at which preceding vehicle following cruise control is executed and the upper speed limit, lower speed limit, and vehicle speed setting of the high and low speed following cruise control modes.

Also, although the preferred embodiment described herein presents an example in which the preceding vehicle following cruise control system is configured to shift automatically from the low speed following cruise control mode to the high speed following cruise control mode when the vehicle speed enters the high speed region from the low speed region while the vehicle speed setting is set (i.e., while the vehicle speed setting is stored in the prescribed address of the RAM 10c), the invention is not limited to such an arrangement. It is also acceptable to configure the preceding vehicle following cruise control system such that when the driver performs an operation for changing the following cruise control mode between the low speed following cruise control mode and the high speed following cruise mode, the fact that the mode switching operation occurred, i.e., a mode switching operation history, is stored in, for example, the RAM 10c. Then, when the vehicle speed enters the high speed region from the low speed region while the mode switching operation history is stored in the RAM 10c, the following cruise control mode is configured to shift automatically from the low speed following cruise control mode to the high speed following cruise control mode. In such a case, step S26 of FIG. 4 should be replaced with step S26' in which the following cruise control controller 10 is configured to determine if the mode switching operation history is stored in the RAM 10c. In other words, the preceding vehicle following cruise control system of the present invention can be configured to determine the automatic mode shift condition is satisfied when the mode switching operation history is stored in the RAM 10c.

Accordingly, the preceding vehicle following cruise control system of the present invention is configured to automatically shift from the low speed following cruise control mode to the high speed following cruise control mode when the vehicle speed changes from the low speed region to the high speed region while the vehicle speed setting is set.

Also, the preceding vehicle following cruise control system in accordance with the present invention is configured shift automatically from a low speed following cruise control mode to the high speed following cruise control mode when the vehicle speed changes from the low speed region to the high speed region while the mode switching operation history indicating that the following cruise control mode has been changed from the low speed following cruise control mode to the high speed following cruise control mode by operating the mode switching operating member is stored in the memory section (i.e., the RAM 10c).

With the present invention, when the driver has already experienced the following cruise control in the high speed following cruise control mode once and there is no reason why shifting automatically to the high speed following cruise control mode should be a problem, the preceding vehicle following cruise control system is configured to shift to the high speed following cruise control mode automatically without the need for the driver to change the mode manually by operating a mode switching operating member. Thus, the system is more convenient with respect to switching (changing) the following cruise control mode.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A preceding vehicle following cruise control system comprising:
    a vehicle speed detecting section configured and arranged to detect a vehicle speed of a host vehicle;
    a preceding vehicle detecting section configured and arranged to detect a preceding vehicle in front of the host vehicle; and
    a following cruise control section configured and arranged to selectively execute based on a driving condition one of a high speed following cruise control mode in a high speed region and a low speed following cruise control mode in a low speed region, and to automatically shift from the low speed following cruise control mode to the high speed following cruise control mode when an automatic mode shifting condition indicating the high speed following cruise control mode was previously executed is satisfied and when the vehicle speed changes from the low speed region to the high speed region.

2. The preceding vehicle following cruise control system as recited in claim 1, wherein
    the following cruise control section being further configured to selectively execute one of
        the high speed following cruise control mode in the high speed region in which a following cruise control is executed such that the host vehicle follows the preceding vehicle while maintaining a first prescribed following distance when the preceding vehicle is detected, and a constant speed cruise control is executed such that the host vehicle travels at a constant speed state at a vehicle speed setting when the preceding vehicle is not detected, and
        the low speed following cruise control mode in the low speed region in which a following cruise control is executed such that the host vehicle follows the preceding vehicle while maintaining a second prescribed following distance when the preceding vehicle is detected, and the following cruise control is canceled when the preceding vehicle is not detected, and
    the following cruise control section being further configured to determine the automatic mode shifting condition is satisfied when the vehicle speed setting has been set.

3. The preceding vehicle following cruise control system as recited in claim 1, further comprising
    a mode switching operating member configured and arranged to issue a command for switching from the low speed following cruise control mode to the high speed following cruise control mode, and
    a memory section configured and arranged to store a history of a mode switch operation of switching from the low speed following cruise control mode to the high speed following cruise control mode when the mode switching operating member is operated to switch from the low speed following cruise control mode to the high speed following cruise control mode,
    the following cruise control section being further configured to determine the automatic mode shifting condition is satisfied when the mode switch operation has been stored in the memory section.

4. The preceding vehicle following cruise control system as recited in claim 1, further comprising a road information detecting section configured and arranged to detect a legal speed limit of a road on which the host vehicle is traveling, the following cruise control section being further configured to prohibit automatically shifting from the low speed following cruise control mode to the high speed following cruise control mode when the legal speed limit of the road is equal to or lower than an upper speed limit of the low speed region.

5. The preceding vehicle following cruise control system as recited in claim 1, further comprising a reporting section configured and arranged to report to a driver of the host vehicle that the following cruise control section automatically shifted from the low speed following cruise control mode to the high speed following cruise control mode.

6. The preceding vehicle following cruise control system as recited in claim 1, further comprising a reporting section configured and arranged to report to a driver of the host vehicle that an automatic shifting from the low speed following cruise control mode to the high speed following cruise control mode can be executed.

7. The preceding vehicle following cruise control system as recited in claim 2, further comprising a road information detecting section configured and arranged to detect a legal speed limit of a road on which the host vehicle is traveling, the following cruise control section being further configured to prohibit automatically shifting from the low speed following cruise control mode to the high speed following cruise control mode when the legal speed limit of the road is equal to or lower than an upper speed limit of the low speed region.

8. The preceding vehicle following cruise control system as recited in claim 2, further comprising a road information detecting section configured and arranged to detect a legal speed limit of a road on which the host vehicle is traveling, and a vehicle speed limiting section configured and arranged to limit the vehicle speed of the host vehicle to the legal speed limit of the road when the vehicle speed setting exceeds the legal speed limit after the following cruise control section shifts from the low speed following cruise control mode to the high speed following cruise control mode.

9. The preceding vehicle following cruise control system as recited in claim 2, further comprising a reporting section configured and arranged to report to a driver of the host vehicle that the following cruise control section automatically shifted from the low speed following cruise control mode to the high speed following cruise control mode.

10. The preceding vehicle following cruise control system as recited in claim 2, further comprising a reporting section configured and arranged to report to a driver of the host vehicle that an automatic shifting from the low speed following cruise control mode to the high speed following cruise control mode can be executed.

11. The preceding vehicle following cruise control system as recited in claim 3, further comprising a road information detecting section configured and arranged to detect a legal speed limit of a road on which the host vehicle is traveling, the following cruise control section being further configured to prohibit automatically shifting from the low speed following cruise control mode to the high speed following cruise control mode when the legal speed limit of the road is equal to or lower than an upper speed limit of the low speed region.

12. The preceding vehicle following cruise control system as recited in claim 3, further comprising a reporting section configured and arranged to report to a driver of the host vehicle that the following cruise control mode has been automatically shifted from the low speed following cruise control mode to the high speed following cruise control mode.

13. The preceding vehicle following cruise control system as recited in claim 3, further comprising a reporting section configured and arranged to report to a driver of the host vehicle that an automatic shifting from the low speed following cruise control mode to the high speed following cruise control mode can be executed.

14. A preceding vehicle following cruise control system comprising:

vehicle speed detecting means for detecting a vehicle speed of a host vehicle;

preceding vehicle detecting means for detecting a preceding vehicle in front of the host vehicle; and following cruise control means for selectively executing based on a driving condition one of a high speed following cruise control mode in a high speed region and a low speed following cruise control mode in a low speed region, and for automatically shifting from the low speed following cruise control mode to the high speed following cruise control mode when an automatic mode shifting condition indicating the high speed following cruise control mode was previously executed is satisfied and when the vehicle speed changes from the low speed region to the high speed region.

15. A preceding vehicle following cruise control method comprising:

detecting a vehicle speed of a host vehicle;

detecting a preceding vehicle in front of the host vehicle;

selectively executing based on a driving condition one of a high speed following cruise control mode in a high speed region and a low speed following cruise control mode in a low speed region; and automatically shifting from the low speed following cruise control mode to the high speed following cruise control mode when an automatic mode shifting condition indicating the high speed following cruise control mode was previously executed is satisfied and when the vehicle speed changes from the low speed region to the high speed region.

* * * * *